(No Model.) 3 Sheets—Sheet 1.
G. LEVERICH.
POWER PLANT FOR CABLE RAILWAYS.
No. 436,423. Patented Sept. 16, 1890.
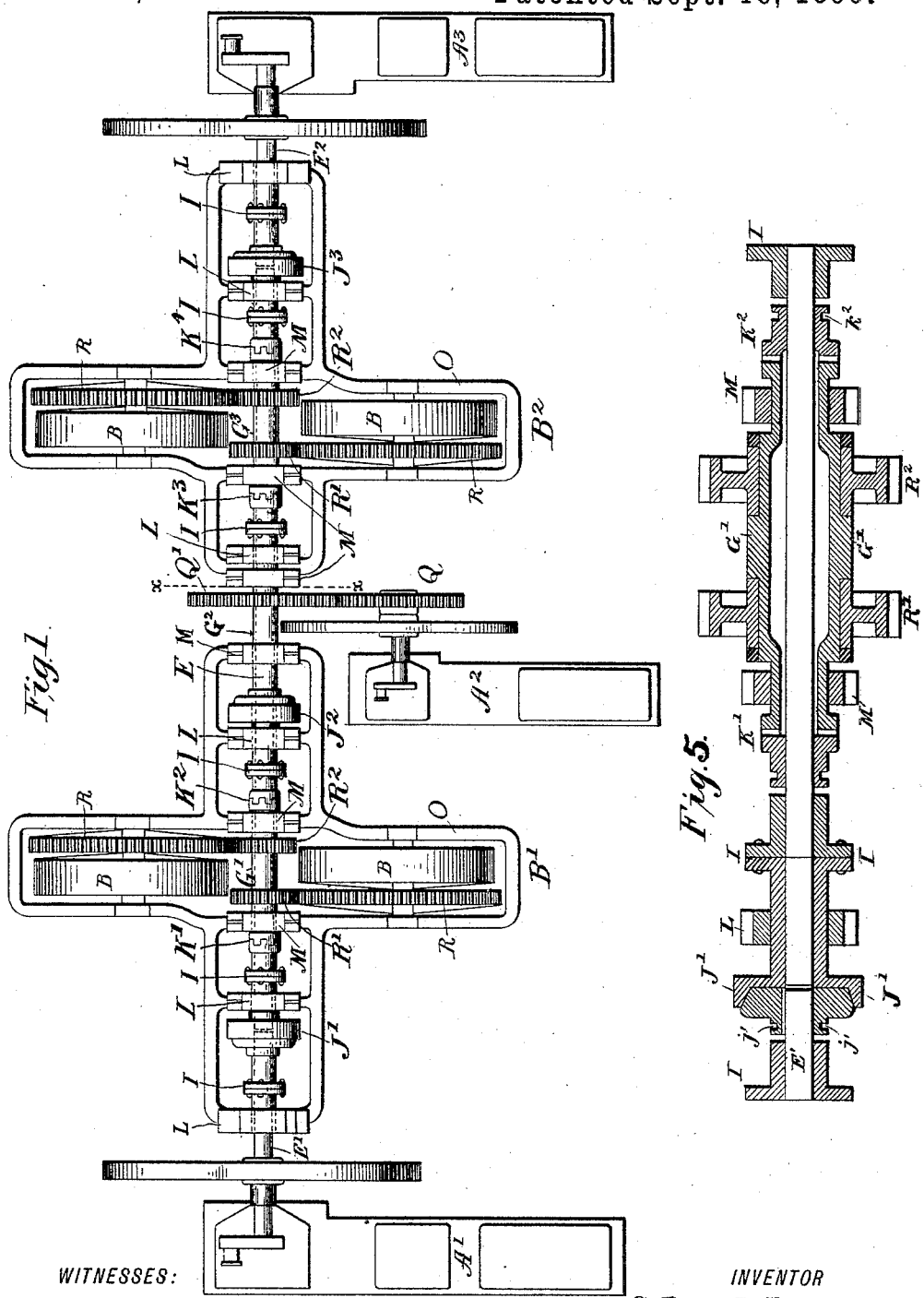
WITNESSES:
INVENTOR
Gabriel Leverich
BY
ATTORNEY.

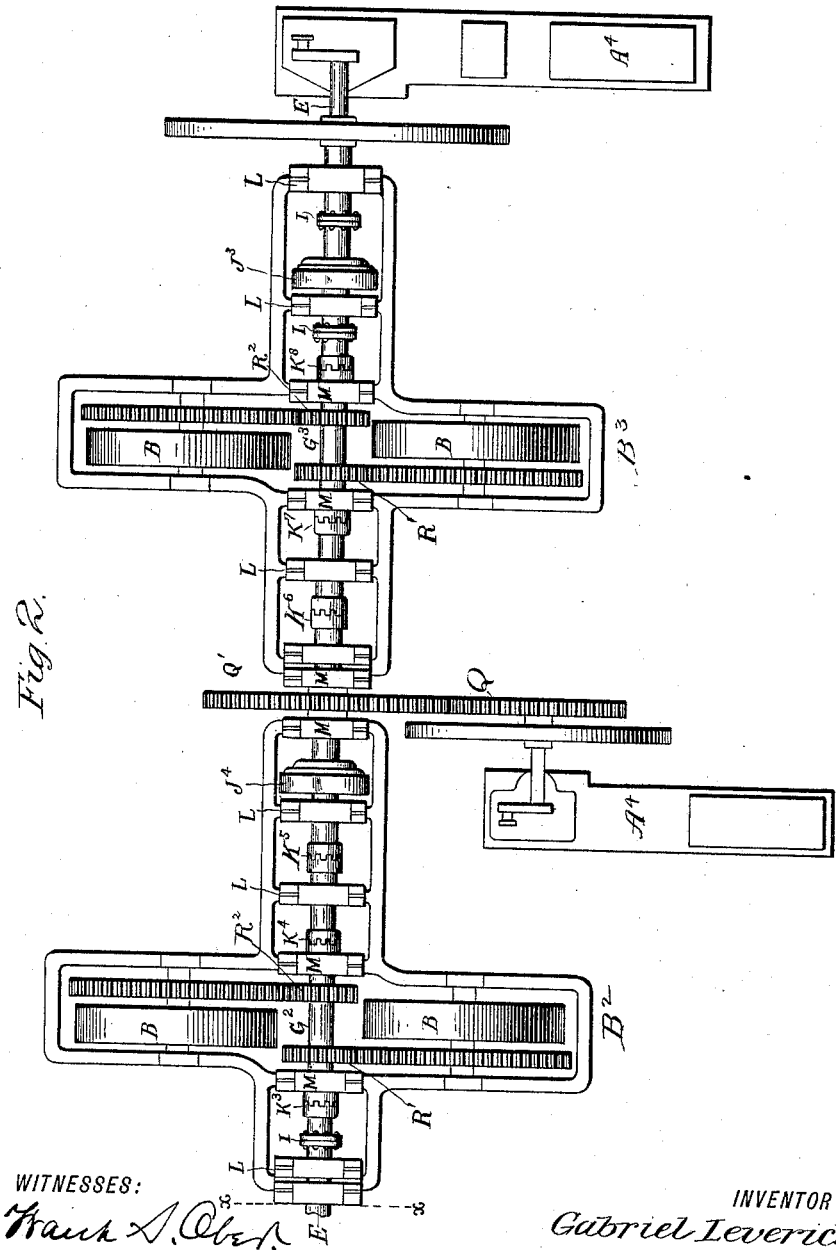

(No Model.) 3 Sheets—Sheet 3.
G. LEVERICH.
POWER PLANT FOR CABLE RAILWAYS.
No. 436,423. Patented Sept. 16, 1890.
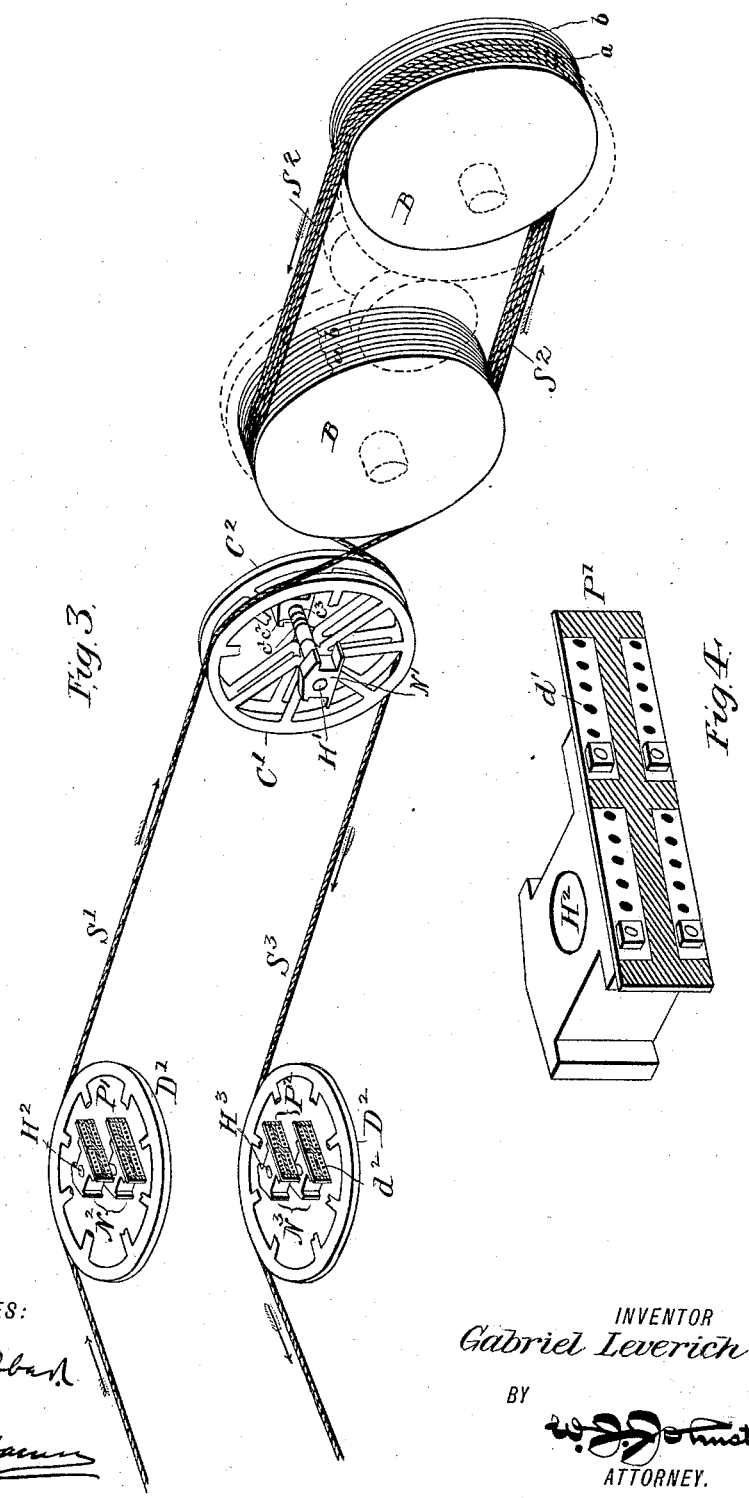
WITNESSES:
Frank S. Ober
Wm. A. Rosenbaum
INVENTOR
Gabriel Leverich
BY
Johnston
ATTORNEY.

UNITED STATES PATENT OFFICE.

GABRIEL LEVERICH, OF SOUTH ORANGE, NEW JERSEY.

POWER PLANT FOR CABLE RAILWAYS.

SPECIFICATION forming part of Letters Patent No. 436,423, dated September 16, 1890.

Application filed January 18, 1890. Serial No. 337,360. (No model.)

*To all whom it may concern:*

Be it known that I, GABRIEL LEVERICH, residing in the township of South Orange, in the county of Essex and State of New Jersey, have invented certain new and useful Improvements in Power Plants for Cable Railways, of which the following is a specification.

My invention relates to power plants for cable railways.

On a railway for the transportation of passengers or freight, where the cars are hauled by an endless cable operated by steam-power, the aggregate loads imposed on the driving-engines vary with the traffic, the grades on the railway, and the resistances along the rails, and of the machinery.

To haul the maximum number of cars over a cable railway having two lines of tracks— one for trains in each direction—it may be desirable to lay on the two lines two or more cables, each with its pair of rails, and in constructing the power plant to provide means for driving the cables separately at one time. By this I mean that instead of one pair of rails and cable in one direction and one pair of rails and cable in the other direction it may sometimes be desirable to have two or more pairs of rails and corresponding cables for the trains in each direction. Each of the two lines, therefore, may consist of a plurality of tracks and cables. The tracks may be interlaid or not, as required.

To operate such a railway continuously and economically the power plant should be so designed that either or all the cables may generally be driven day after day without stopping, or one or more cables may be stopped for repairs to it or the driving machinery or as the traffic lessens, without interfering with the use of the other cables, and when the traffic varies with regularity during the day, or on different days is affected by the occasion or the weather, change may be made at the proper time from one driving-engine to another of greater or lesser power, or two or more engines may be operated together, so that usually the power applied shall be best adapted to the work to be done; also, for some railways the power plant should be so arranged that, beginning with one or more cables and the smaller power required to drive them, without disturbing this plant or interfering with its use, other cables with their driving engines and machinery may be added from time to time as the increase of traffic or extension of railway demands.

The purpose of this invention is to provide a power plant for cable railways which shall drive one or more cables separately or together, each and its driving mechanism independently of the others, permit repairs and renewals of a cable and its machinery to be made as required while the other cables are operated, provide for change from one driving-engine to another of greater or less capacity, or the use of two or more driving-engines, as the imposed loads vary, and without stopping the plant, and allow extension of the plant while in continued use.

Referring to the accompanying drawings, Figure 1 represents a plan of the power plant with three driving-engines and two pairs of winding-drums. Fig. 2 shows a plan of that portion of a plant which it is necessary to add to what is shown in Fig. 1 to increase the plant by one engine and a pair of drums. The dotted line X X on Fig. 1 indicates where Fig. 2 begins. Fig. 3 is a perspective view of a pair of winding-drums and two pairs of deflecting-sheaves. Fig. 4 is an enlarged view of one of the pillow-blocks supporting the deflecting-sheaves; and Fig. 5 is an enlarged sectional view of one section of the shafting, clutches, &c.

Like parts are designated in the drawings by the same letter, with different numerical postscripts for the several parts of a kind.

In a power plant as shown, Fig. 1, the three driving-engines $A'$ $A^2$ $A^3$, and the two pairs of driving-drums $B'$ $B^2$, are placed on parallel lines spaced nearly equal distances apart. Engines $A'$ and $A^3$ are on the outer lines, engine $A^2$ is on the central line, and a pair of winding-drums $B'$ or $B^2$ is nearly midway between engines $A'$ and $A^2$ or engines $A^2$ and $A^3$. The shafts of the two outer engines $A'$ and $A^3$ are in one line, and form the end sections $E'$ $E^2$ of the main shaft E, to which thereby these engines are directly attached. Engine $A^2$ drives the shaft by means of a pair of spur-gears Q Q'.

The main shaft E is made up of sections joined together by the bolted couplings I to form the complete shaft. Of these sections there may be as many as desired. The main shaft is divided at suitable points and provided with friction-clutches hereinafter described, to form three parts, one for each engine. These parts are connected or disconnected by the friction-clutches $J'$ $J^3$, which may consist of any well-known form. As indicated in outline in the drawings, the convex portion is splined on the main shaft and set into or removed from the concave portion by any means, as by a yoke-lever (not shown) entering the annular groove $j'$. On the central part surrounding the main shaft, but not in contact with it, are three long sleeves or hollow shafts. One $G^2$, for engine $A^2$, carries the spur-gear $Q'$, and by friction-clutch $J^2$ drives the main shaft, and two $G'$ $G^3$, for the winding-drums, each of which carries two spur-pinions $R'$ $R^2$, and is driven by the jaw-clutches $K'$ $K^2$ or $K^3$ $K^4$. These clutches are in pairs, and, as indicated in outline, have interlocking jaws, such as shown in my contemporaneous application, Serial No. 337,358. The movable jaw may be operated by any means—such as a yoke-lever (not shown) entering the annular groove $k^2$. These pairs of clutches are located one at each end of the hollow shaft and are set up toward each other, so that when they are closed the outer shaft, if it, from wear or other cause, was eccentric to the inner shaft, is brought to a concentric position, as fully described in my application above referred to. The two shafts become practically one, and there is no side-thrust on the pillow-blocks. The main shaft is supported by the pillow-blocks L and the hollow shafts by the pillow-blocks M, each independent of the other, and so placed that either section of a main shaft or a hollow shaft entire may be removed without leaving other sections or hollow shafts unsupported.

The drums B are placed in pairs, the two of each pair on opposite sides of the main shaft and the drum-shafts in vertical planes equidistant from and parallel to it. These shafts are slightly inclined to the horizontal plane and in contrary directions, so that when the cable is wound in the grooves $a$ or $b$ of the drum-faces provided therefor its several wraps form an elongated spiral, and it passes freely from one drum to the other in the lines of movement. Each of a pair of drums may be driven from the main shaft by the spur-pinions and gears R $R'$ $R^2$, as shown in the drawings, or but one drum may be so driven.

The pillow-blocks of a pair of drums of the hollow drum-shaft and of a portion of the main shaft extending on each side are supported by the connected cast-iron bed plate or frame O, made in parts and strongly bolted together, and to which the pillow-blocks are rigidly secured, whereby the part of a power plant thus sustained is firmly held in position and independent displacement of the several members in either direction is prevented.

The cables are endless and hauled continuously in one direction, as indicated by arrows, Fig. 3. Where, as in the case here described, the portion of the railway which is adjacent to the power plant is parallel to the main shaft and somewhat distant from it, beginning with the incoming line, the course of a single cable $S'$ $S^2$ $S^3$ to and from the winding-drums is as follows: It passes about the upper horizontal sheave $D'$ and over the vertical sheave $C'$ to the nearest drum, thence around the two drums, usually three or four times, under the vertical sheave $C^2$, about the lower horizontal sheave $D^2$, and outward.

Each of the horizontal sheaves $D'$ $D^2$ has a shaft $H^2$ $H^3$, which revolves in a pair of pillow-blocks $N^2$ or $N^3$, and these are bolted to the sheave-frame $P'$ or $P^2$. The two vertical sheaves $C'$ $C^2$ rotate in the same direction on one shaft $H'$, which revolves in a pair of pillow-blocks $N'$, sheave $C'$ being fixed by a set-screw or otherwise to the shaft, and sheave $C^2$ loose upon it. The distance from the groove in which the cable runs of one of these sheaves to the similar groove of the other sheave should equal that between the incoming and outgoing lines of cable. Hence these sheaves have short hubs on one side, which are placed in contact end to end, as shown, and sheave $C^2$ is kept in position by the adjusting-rings $c'$ $c^2$ $c^3$ on the shaft, these rings filling the entire space between the sheave-hubs and the pillow-blocks.

On the face and around each drum are cut a number of grooves to receive the cable, one for each wrap as the cable is laid, and the others are used after the first grooves employed have become worn. When the cable is transferred from the grooves $a$ to grooves $b$, (shown in Fig. 3,) that it may lead fairly to and from the drums, the deflecting-sheaves must be transferred also the same distance and in the same direction that the cable has been. To permit this to be done quickly and with certainty for the vertical sheaves, the adjusting-rings are made with their lengths differing by a space equal to that between the centers of adjacent drum-grooves, so that, by transferring one or more rings which have a length equal to the space the sheaves have to be shifted from their place on one side of the sheaves, as shown, to that on the other side, the sheaves may be moved and held as before in a new position. For each horizontal sheave, sets of bolt-holes through the sheave-frame $d'$ $d^2$ $d^3$, Fig. 3, are provided to secure the pillow-blocks at the proper place for each required position of the sheave. For convenience in this description, sheaves $C'$ $C^2$ have been termed "vertical" and sheaves $D'$ $D^2$ have been termed "horizontal." In practice, however, they may be inclined from such planes as may be necessary to fairly lead the cable to and from the drums.

The capacity of a steam-engine supplying the motive power should, during the time the engine is operated, be sufficient to haul the maximum aggregate load imposed in that time.

For economical service, there is a definite relation between this capacity and the mean aggregate load. Hence it is desirable that the engines driving the power plant should vary regularly in size, and that the one should be operated which is the most nearly adapted to the work then to be done. Sometimes it may be expedient to apply more than one engine at a time, or to work all of them together.

To illustrate the difference in capacity of the engines for the plant herein described and the range of power they may furnish, let the capacity of engine $A'$ be six hundred horse-power, of engine $A^3$ be four hundred horse-power, and of engine $A^2$ be two hundred horse-power. Then the maximum power applied with one engine working may range from two hundred to six hundred horse-power, with two engines working from six hundred to one thousand horse-power, and with the three engines working the maximum power applied will be twelve hundred horse-power. Whichever engine is operated the drums must be driven at a uniform speed. Hence, for one piston-speed of the engines, the two $A'$ and $A^3$ attached to the main shaft must have the same length of stroke, and the relative pitch of the diameters of the driving-gears Q will be determined by the length of stroke of engine $A^2$.

Referring to the drawings, it will be seen that either engine may drive the main shaft and either one or all of the drums; that change may be made from one driving-engine to another or two engines applied by means of the friction-clutches without stopping the running cables; that a portion of the plant may be operated while the remainder is disabled, and that members may be removed for renewal or repair without disturbing the other members.

How the power plant shown in Fig. 1 may be extended, a third pair of drums $B^3$ and a fourth engine $A^4$ being added, is illustrated in Fig. 2. During the extension, engines $A'$ and $A^2$ may continue to drive the plant in place, as before. Similarly, subsequent additions as required may be made in like manner as here shown.

For convenience of operating the larger plants at points where the main shaft is separated, single jaw-clutches, as $K'$ $K^2$ $K^3$ $K^4$ are put, whereby a part of the shaft may be driven or the plant connected therewith used and the remainder stand at rest.

Having thus described my invention, I claim—

1. In a power plant, a main shaft divided into three or more sections, clutch mechanism for coupling the adjacent sections together, an engine rigidly connected with each of the two end sections, an engine adapted to be connected with each of the other sections by means of suitable clutch mechanism, and driven mechanism connected with one or more of the sections, as set forth.

2. In a power plant, a main shaft divided into three separate sections, clutch mechanism for coupling the adjacent sections together, an engine geared to each section, and other clutch mechanism for connecting and disconnecting driven mechanisms at two different points on one of the sections.

3. In a cable-driving plant, a main shaft divided into three sections, clutch mechanism for coupling the adjacent sections together, an engine geared to each section, and a cable drum or drums geared to the middle section, substantially as described.

4. In a cable-driving system, the combination of a main and a hollow shaft, the latter surrounding the former, a pair of jaw-clutches, one at each end of the hollow shaft for connecting the same with the main shaft, independent pillow-blocks for the two shafts, a driving-drum located on each side of the shaft, and gearing between the said drums and the hollow shaft, whereby said drums are driven from the main shaft.

5. The combination, with the drums, the hollow shaft, the main shaft, and their independent pillow-blocks, of the frame to which said pillow-blocks are rigidly secured, whereby independent displacement of the several members is prevented.

6. The combination, with a cable-driving drum or drums provided with extra grooves, of a pair of deflecting-sheaves, the incoming cable passing over one sheave and the return passing over the other, and a series of washers on the shaft of the sleeve for adjusting said sheaves in accordance with changes in the position of the cable upon the drum or drums.

7. In a power plant for cable railways, a pair of winding-drums, both driven positively, in combination with the cable wrapped several times over said drums, and a pair of deflecting-sheaves, over which the incoming and outgoing lines of cable pass, said sheaves being mounted on a single shaft and turning in the same direction, as set forth.

8. In a power plant, a main shaft composed of three separate sections, clutch mechanism for coupling the adjacent sections together, an engine geared to the intermediate sections, and driven mechanism connected to each of said sections, whereby power may be communicated by the said engine either to the intermediate section alone or to it and the section on either or both sides.

9. The combination, with a cable-driving drum provided with extra grooves, of a deflecting sheave or sheaves in the same or a parallel plane with the drum, and means on the sheave-axis for adjusting the said sheave or sheaves in the line of its axis or their axes to bring the sheave or sheaves into line with the particular groove in the drum from or to which the cable passes.

10. In a power plant, the combination, with a main shaft, of a hollow shaft or sleeve surrounding the same, pillow-blocks supporting the sleeve independently of the shaft, and a pair of clutches, one at each end of the hollow shaft, for connecting the shaft and sleeve together, whereby power may be transmitted from the shaft to driven mechanism through the hollow shaft or sleeve, substantially as described.

11. The combination, with a driving-engine geared to a main shaft, of a hollow shaft surrounding the main shaft, a pair of clutches, one at each end of the hollow shaft, for connecting the hollow and main shafts together, and independent pillow-blocks for the main and hollow shafts.

12. The combination, with a main shaft and a hollow shaft surrounding the same, of a pair of jaw-clutches, one at each end of the hollow shaft, for connecting the two shafts together.

13. In a power plant, a main shaft divided into a plurality of sections, an engine geared to each section, clutch mechanism between the adjacent sections, hollow shafts or sleeves surrounding one or more of the sections, clutch mechanism between a hollow shaft and its section, and driven mechanism geared to the hollow shaft, substantially as described.

In witness whereof I have hereunto signed my name in the presence of two subscribing witnesses.

GABRIEL LEVERICH.

Witnesses:
WM. A. ROSENBAUM,
THOMAS K. TRENCHARD.